Figure 1:
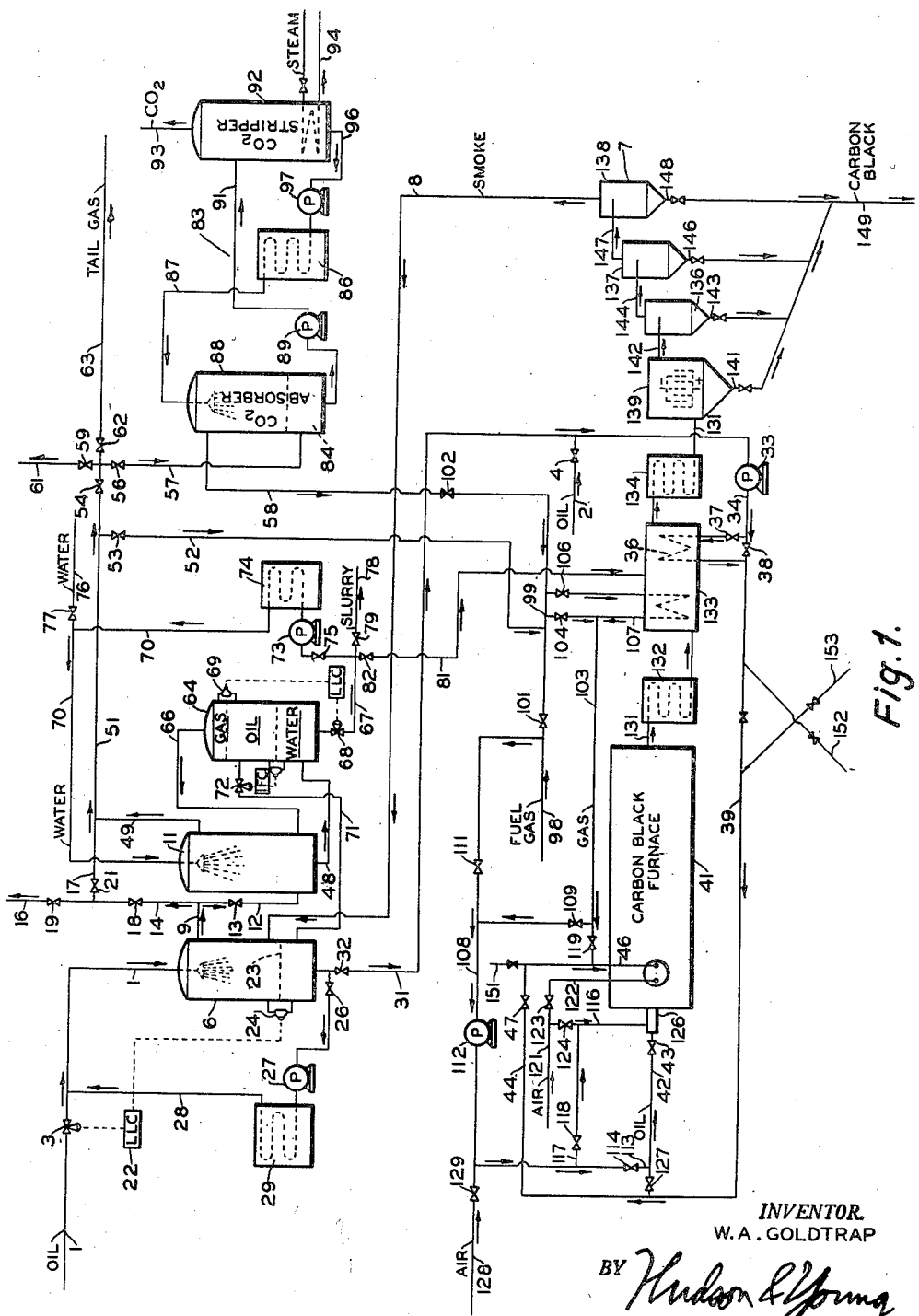

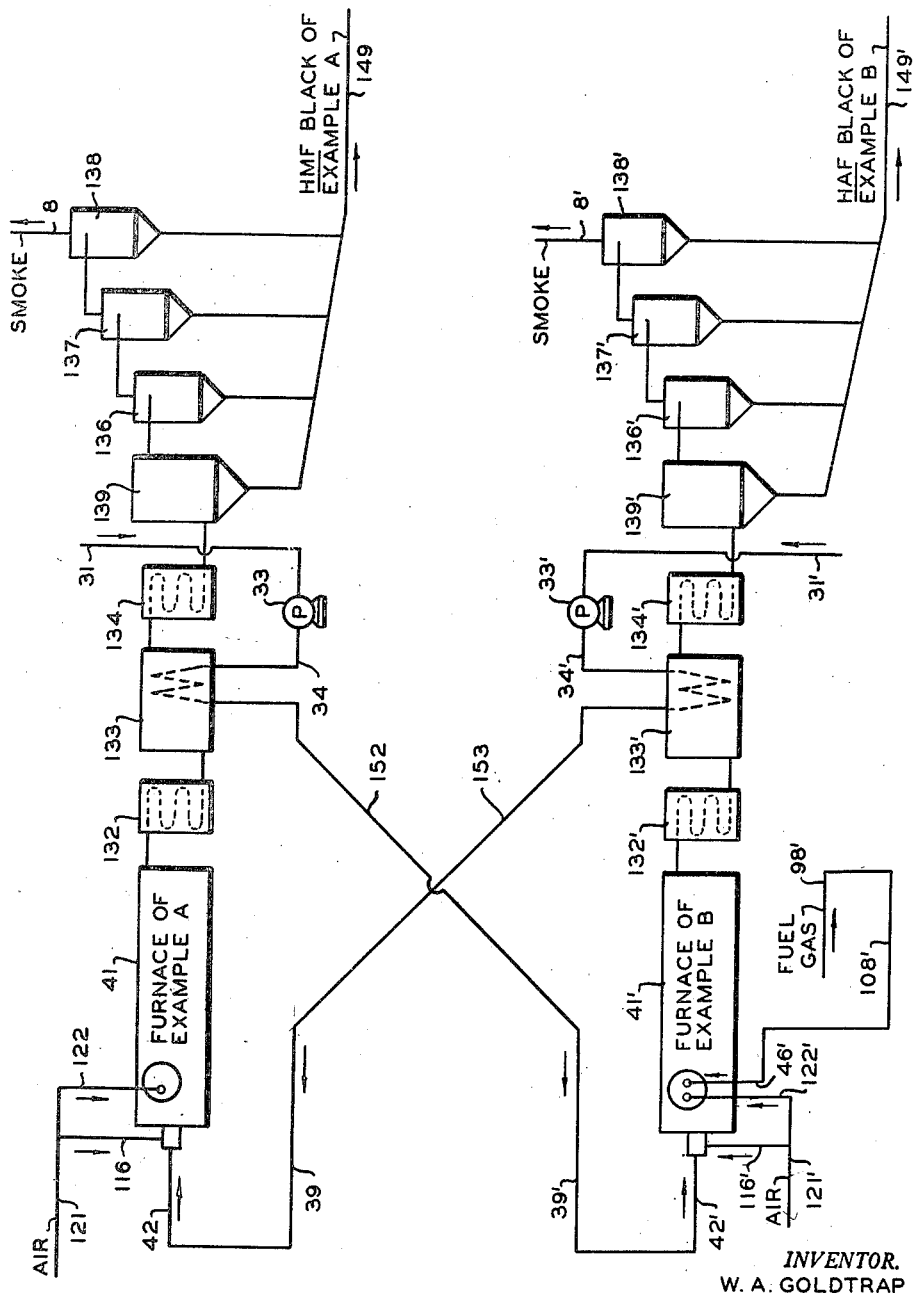

United States Patent Office 2,781,246
Patented Feb. 12, 1957

2,781,246

PROCESS FOR MAKING FURNACE CARBON BLACKS

Walter A. Goldtrap, Bartlesville, Okla., assignor to Phillips Petroleum Company, a corporation of Delaware Application April 20, 1951, Serial No. 221,960

15 Claims. (Cl. 23—209.4)

This invention relates to processes for making carbon black in a furnace out of normally liquid hydrocarbons. In another aspect it relates to apparatus for carrying out such processes. In another aspect it relates to a process of making carbon black in which nuclei of carbon black particles are provided in the vaporized, or atomized, normally liquid hydrocarbon at the first part of the furnace process. In another aspect it relates to making high structure carbon black having great tinting strength for making mixtures of rubbery materials containing the same smoother and superior in extrusion properties. In another aspect it relates to making fine particle, large surface area, carbon black which imparts to rubbery mixtures containing the same high abrasion resistance and strength. In another aspect it relates to the recovery of heat and the removal of residual carbon black from the off-gas after the carbon black collectors for economy and smoke abatement.

In the art of making carbon black out of normally liquid hydrocarbons there are a number of different types of carbon black which can be made. These different types of carbon black have different uses and impart to rubber mixtures containing the same entirely different properties. As a result the sales price of carbon blacks varies widely. The two types of carbon blacks which are most valuable, and have the highest sales price, are (a) high structure carbon blacks which are very black in tint strength or color, which are quite difficult to pellet, and which make rubber mixtures containing the same smooth upon extrusion through an orifice, or after other types of working, and which are especially valuable in making inner tubes for tires where freedom from gas leakage is essential, or in making other rubber products where a smooth finish is desired; and (b) small particle size (and therefore large surface area) carbon blacks which impart to rubber mixtures greater abrasion resistance and therefore are highly useful in the treads of automobile tires, making them last much longer than other tires containing other types of carbon black.

In producing both carbon black (a) and (b) the normally liquid hydrocarbon is vaporized and passed into the furnace, or is atomized by passage through an orifice, with or without the addition of vaporizing aids such as lower boiling liquids or gases, and passed into the furnace, where the vaporized or atomized normally liquid hydrocarbons are turbulently mixed with air, partially combusted therein, and/or are cracked by the heat of other burning fuel gases or vaporized liquids therein, and are relatively quickly quenched, or more slowly cooled below the reaction temperature, by means of direct injection of water, or indirect heat exchange with water, or with the atmosphere, through the pipes containing the resulting effluent smoke. While the reaction of partial combustion, or pyrolitic conversion, takes place in a relatively short time in both instances, in the case of carbon black (a) it is desired to have carbon black nuclei formed on which platelets composed largely of carbon molecules may be disposed in a manner somewhat analogous to crystallization, or the formation of a large fluffy snow flake in the sky. This process of aggregation of the particles continues over a relatively long period of time comparative to the period of time involved when making carbon black (b). The carbon molecule forming the platelets of carbon black (a) are held together by Van der Waal's forces in a resilient, spongy mass which aggregated particles resist further aggregation in the form of pelleting because of their internal forces. It is not desired to theorize as to the structure of this carbon black, but merely to characterize it sufficiently to identify it to those skilled in the art.

Obviously in order to attain the maximum amount of aggregation of platelets into the particles of carbon black (a) it is desirable to start immediately with preformed carbon black nuclei and to have a high degree of turbulence in the furnace in order to carry out as much aggregation as possible by as many collisions of the particles with sub-particles in the short time they are in the reaction zone. Unduly extending the time of reaction degenerates this valuable structure of carbon black (a) into much less valuable so-called "color blacks" which lack structure, resilience, and ability to make rubber materials smoother, or extrudable, but which are only of value for making printing ink, other inks, and other low value uses such as making battery jars and the like.

In the case of carbon black (b) the shorter the time of exposure to partial combustion and/or pyrolitic action, and the greater the proportion of diluent gases between the particles, the smaller the particles will be and the greater will be their surface area in acres per pound and the greater the abrasion resistance imparted to rubber mixtures by the same. However, this short time of combustion and/or pyrolitic treatment and the large proportion of diluent generally results in a low yield of pounds of carbon black per gallon of normally liquid hydrocarbon because there is hardly time for suitable nuclei to form, especially if the type of normally liquid hydrocarbon chosen is, for example, mainly paraffinic. By choosing a normally liquid hydrocarbon of a high aromatic content and/or high carbon residue, the yield is substantially improved.

The practice of the present invention, however, not only conserves heat which would otherwise be lost, but provides large numbers of carbon black nuclei at the start of the reaction, valuable as stated above in making either carbon black (a) or (b) regardless of the type of liquid hydrocarbon feed employed, and thus clearly increases the field of possible cheap hydrocarbons available for making carbon black.

One object of this invention is to provide an improved process for making carbon blacks.

Another object is to provide an improved process for making structure blacks such as carbon black (a).

Another object is to provide an improved process for making high abrasion carbon blacks such as carbon black (b).

Another object is to provide a means for removing fine carbon black particles from the effluent gases of a carbon black plant before they are discharged to the atmosphere and thus provide suitable smoke abatement so that the carbon black plant may be used near a city and without becoming a public nuisance.

Another object is to conserve a considerable percentage of carbon black that would otherwise be lost to the atmosphere by returning the same to the furnace, where some particles may burn to furnish heat and others act as nuclei for the formation of larger particles which are too large to escape through the usual carbon black separating means, thereby becoming a portion of the product of the process instead of a lost by-product.

Another object is to conserve heat by utilizing the waste heat in preheating and/or vaporizing and/or atomizing the normally liquid hydrocarbon feed.

Another object is to provide suitable carbon black nuclei to the first portion of a furnace process.

Another object is to recover heat from a process for the manufacture of carbon black and at the same time scrub out the residual carbon black in the off-gas after the collectors.

Another object is to provide suitable apparatus for efficiently and inexpensively carrying out the above processes, which apparatus will be rugged, foolproof, and easy to maintain in service.

Numerous other objects and advantages will be apparent to those skilled in the art upon reading the accompanying specification, claims and drawings.

In the drawing:

Figure 1 of the drawing is a diagrammatic representation of a furnace type carbon black plant which embodies processes and apparatus comprising the present invention.

Figure 2 is a view similar to Figure 1 showing a portion thereof employing a carbon black furnace 41 operating as in Example A below connected by crossover lines 152 and 153 (as explained below) with a portion of a similar system employing a carbon black furnace 41' operating as in Example B below.

In Figure 1, normally liquid hydrocarbon feed enters the process through lines 1 and/or 2, the amount entering the process being governed by valves 3 and 4 respectively, either of which valves can completely shut off its respective source of feed. By hydrocarbon feed it is intended to mean a feed predominantly comprising hydrocarbons by weight percent, but there may be some oxygen, nitrogen, sulfur, and other atoms present in some of the molecules, such as is more common in feed stocks coming from the destructive distillation of coal, so called coal tar by-products and the like, rather than petroleum refinery products or crude oils which generally are largely hydrocarbons with perhaps some sulfur compounds present. In the past considerable care has had to be exercised in the choice of a hydrocarbon feed stock for carbon black furnace processes, it being preferable to have a large percentage of aromatic content, as evidenced by the U. S. Bureau of Mines Correlation Index, in which the heavier the API gravity and the lower the 50 percent evaporated boiling point, the better the material is as a feed for carbon black. In addition it has often been preferred to have residual carbon present in the feed even in the case of distillate feeds, and in the case of residual feeds it has often been considered advantageous to have residual carbon and/or considerable amounts of asphaltenes present. In the present invention by washing the smoke from the carbon black process with the feed from line 1 in scrubbing vessel 6 it is no longer as essential that aromatic materials be present in said feed, and it is not necessary that there be any residual carbon and/or asphaltenes in said feed to furnish nuclei for growth into carbon black in the furnace because sufficient nuclei are picked up by said feed from the smoke while passing through scrubber 6. This increases the range of useful feeds of higher yields to all normally liquid hydrocarbons, hydrocarbons being defined above as predominantly so by weight with only minor admixtures of carbohydrates and nitrogen, sulfur or other compounds with hydrogen and carbon.

The hydrocarbon feed from line 1 is sprayed into the top of scrubber 6 and the smoke from the carbon black collection system generally designated as 7 passes through pipe 8, into oil scrubber 6 and out pipe 9 to a water washer 11 through pipe 12 when valve 13 is open, or through pipe 14 to the atmosphere at 16, or through pipe 17 for further use depending upon the position of valves 18, 19 and 21. The amount of hydrocarbon entering through line 1 may be controlled by a liquid level control 22 which controls valve 3 by the level of hydrocarbon 23 in vessel 6 by means of the usual float 24 and conventional connections. While a single pass may be employed, it is preferred to recycle a proportion of the oil, and when employing such recycle, valve 26 is open and pump means 27 for elevating the recycle fluid through line 28 and cooling means 29 to prevent an undue rise of temperature in vessel 6 may be provided. The hydrocarbon feed from vessel 6 passes through line 31 in an amount controlled by valve 32, aided by pumping means 33 (if necessary) and supplemented, or even replaced, if desired, by hydrocarbon feed from line 2, coming through valve 4. The feed from pump 33 in line 34 may be preheated and/or partially or wholly vaporized by passing any desired proportion through heat exchange coils 36 depending on the position of valves 37 and 38. By closing valve 37 completely and opening valve 38, such preheating may be eliminated. The feed then passes through line 39 into carbon black furnace 41 predominantly axially of the furnace in direction, through pipe 42 controlled by valve 43 and/or predominantly radially to, or tangentially to, the inner wall of said furnace through pipes 44 and 46 if desired, by opening valve 47.

Both the oil scrubber 6 and the water scrubber 11 may be any conventional type of spray apparatus and may contain any known arrangements of plates or baffles therein (not shown).

The gas 12 passes through chamber 11 where the water washes out any remaining carbon black, and condenses and removes through pipes 48 into hydrocarbon feed 23 which may have been carried out of chamber 6 as vapor and/or entrained droplets through lines 9 and 12. The completely washed tail gas passes through pipe 49 into pipe 51. When washer 11 is not employed and valves 13 and 19 are closed and 18 and 21 are open, the tail gas from vessel 6 passes directly through pipes 9, 14 and 17 into pipe 51 in which case the hydrocarbon feed carried out of chamber 6 in line 9 enriches the B. t. u. content of the gas, but at such a cost that economics then demand that this gas be used for fuel or some other useful purpose, and not be vented to the atmosphere. The tail gas in pipe 51 may be recycled to the furnace 41 through pipe 52 by opening valve 53 directly without removal of carbon dioxide, or by opening valves 54 and 56 it may be recycled through pipes 57 and 58 to furnace 41 after carbon dioxide reduction or removal. Alternatively valves 53 and 56 can both be closed and with valve 54 open the tail gas may be passed through valve 59 to the atmosphere at 61 and/or valve 62 for fuel gas, or any other desired purpose, through line 63.

As the liquid in line 48 contains oil, water, and sometimes gas, it is desirable to run the same by gravity, or a pump (not shown) into a separator 64 where the gas, oil and water separate as indicated. The gas returns through line 66 to washer 11. The water passes out through line 67 controlled by valve 68 according to the liquid level control 69. The oil is recycled through line 71 to washer 6, controlled by interface control valve 72. The water 67 generally contains almost no carbon black as oil scrubber 6 substantially removes all the carbon black before the gas passes through water washer 11, the function of the water washer 11 being chiefly to recover the oil coming out of scrubber 6 through pipes 9 and 12, so this water 67 may be recycled through line 70 controlled by valve 75 and aided by pump 73. To avoid heat build-up, a cooler 74 may be employed and make-up water may be added through line 76 controlled by valve 77 to make up the water carried out as vapor through line 49. If, however, some carbon black may gradually accumulate in the water in line 67 its concentration may be prevented from undue increase by bleeding off some of the resulting slurry through line 78, controlled by valve 79, or said slurry may be recycled to any portion of the furnace process warm enough to evaporate the same, through line 81 controlled by valve 82.

The removal of carbon dioxide may be done by a conventional $CO_2$ absorption system generally designated as 83, preferably employing an aqueous alkaline wash fluid 84, which may comprise water and diethylamine, or water and potassium hydroxide, which solution is cooled in cooler 86, passes through pipe 87, absorbs $CO_2$ in absorber 88, carries the $CO_2$ in solution through pump 89 and pipe 91 into a conventional $CO_2$ stripper 92 where the $CO_2$ is driven off through pipe 93 because of heat added through pipe 94, the stripped liquid then passing through pipe 96 and pump 97 into pipe 87, completing the cycle.

The fuel gas coming from line 98 and/or the tail gas coming from line 52 containing carbon dioxide and/or the tail gas coming from line 58 with a reduced quantity of, or no substantial amount of carbon dioxide, may be supplied in desired amounts to line 99 by adjusting valves 101, 102, 53, 54, and 56. This gas from line 99 may be passed into line 103 directly through valve 104 or may be preheated by passing though valve 106 and preheating coils 107 into line 103. Fuel 98 and/or gas from line 103 may be passed into line 108 depending on the position of valves 109 and 111, whereupon pump 112 may admix the same with oil in line 42 through line 113 controlled by valve 114 or into admixture with air in line 116 through line 117 controlled by valve 118. By opening valve 119 gas from line 103 may pass through line 46 generally radially or tangentially with respect to the interior surface of the carbon black furnace 41. At the same time compressed air 121 may be added through pipe 116 in a generally axial direction or through pipe 122 generally tangentially or radially into furnace 41 depending on the setting of valves 123 and 124.

Carbon black furnace 41 may be any carbon black furnace known to the prior art. The interior thereof may consist of a single cylindrical or rectangular chamber, or a series of chambers of different cross sectional areas. The oil and air may be added at different points and in different ways, and the same is true of the gas when such is employed, several procedures preferred being set forth in the following paragraphs.

Hydrocarbon vapor in pipe 42, or preheated oil largely flashing into vapor after passing through valve 43 from pipe 42, may be discharged generally axially into furnace 41, or hydrocarbon liquid in pipe 42 may be sprayed into furnace 41 in a direction with an axial component. If desired an annulus of air may be added through pipe 116 which may be lead to an annular space 126 and discharged as an annulus around the incoming oil 42. Air is introduced preferably tangentially through pipe 122 into the furnace. This tends to make (a) high structure carbon black.

On the other hand, gas may be added through line 46, or some of the oil 39 may be added through lines 44 and 46 to burn with the air from line 122 before contacting the axially moving hydrocarbon 42, all other operations being as before described, in which case the process tends to make (b) high abrasion furnace black, especially if there is an enlarged chamber in the furnace adjacent to the point of introduction of pipe 122 and 46, and a reduced section leading to the outlet end of the furnace.

Another operation, that can be varied to produce either type of carbon black, comprises closing valve 127, opening valve 47, closing valves 118, 119, 123 and opening valves 109, 124, in which case gas and air coming in pipes 42 and 116 form a turbulent flame in the carbon black furnace 41 into which the normally liquid hydrocarbon 39 entering through lines 44 and 46 is injected, preferably radially.

When, in the operations described in the three preceding paragraphs, or in other carbon black processes known in the prior art, the hydrocarbon in line 39 contains a substantial proportion of oil of a residual nature that cannot be vaporized, then it is necessary to employ a spray nozzle on the end of pipe 42, where the oil enters furnace 41, any spray nozzle producing a suitable conical, solid or hollow spray being used. In order to aid with either the vaporization and/or the spraying and resulting evaporation of normally liquid fuel in line 42, especially when it is of a heavy viscous nature, gas may be introduced into the oil in line 42 from line 108 and pump 112 and/or line 128 through valves 129 and 114.

Whether the normally liquid hydrocarbon feed is vaporized and passed into the furnace or is atomized by passage through an orifice, with or without the addition of vaporizing aids such as lower boiling liquids or gas, and passed into the furnace where the vaporized or atomized normally liquid hydrocarbons are turbulently mixed with air, partially combusted therein and/or are cracked by the heat of other burning fuels therein, the resulting carbon black-containing smoke emerges from the furnace through pipe 131 and is preferably relatively quickly quenched, or more slowly cooled, below the reaction temperature in cooler 132. While shown as an indirect heat exchanger, cooling at 132 may also be by means of direct injection of water (not shown) or by heat exchange with the atmosphere through sufficiently long pipes which may be provided with conventional cooling fins (not shown). A portion of said cooling may take place in heat exchanger 133 in heat exchange with gas in pipe 107 and/or in heat exchange with oil in pipe 36 and the amount of cooling in 132 may be reduced to zero in which case the first quench or cooling takes place in the heat exchanger 133. Similarly any desired portion of the cooling load may be taken up by after-cooler 134.

Preferably after-cooler 134 is used as a trimming cooler so that the smoke in pipe 131 as it enters the first element of the carbon black removal system 7 will be at exactly the desired temperature.

Carbon black removal system 7 can embody any of the usual means of removing carbon black from smoke, such as desired, comprising any single device, or any combination of one or more cyclone separators 136, 137 and 138 in series or in parallel in any desired order along with such devices as bag filters (not shown), supersonic separators or sirens (not shown), the only limitation being that a dry separation process be employed. A preferred illustrative embodiment comprises an electrical precipitator 139, which receives the smoke from pipe 131, precipitates a small portion thereof through pipe 141 and tends to agglomerate the remainder of the carbon black into large particles or flocks in the smoke which passes through pipe 142 into primary cyclone 136 where a large proportion of the carbon black separates out through pipe 143. The remaining smoke passes into secondary cyclone 137 where a major proportion of the remaining carbon black passes out through pipe 146 and the still further attenuated smoke passes out through pipe 147 into tertiary cyclone 138. Most of the remaining carbon black drops through pipe 148, so that the smoke in pipe 8 is very attenuated. It was formerly the practice to discharge smoke of the concentration of that in pipe 8 directly into the atmosphere, but this is a considerable economic waste and creates a smoke nuisance which should be abated provided this can be done. The present invention describes an economical and practical system for abating smoke, recovering carbon black, recovering the heat that otherwise would be lost in the smoke, providing carbon nuclei for the formation of carbon black in the furnace, preheating the feed going to the furnace, conserving the heat of the process, and producing superior grades of carbon black, all in a single unitary process.

The carbon black recovered at 141; 143; 146 and 148 is caught by collection system 149, and this carbon black contains some of the carbon black that passes out through smoke pipe 8, because that carbon black which passes out pipe 8 is substantially completely returned to the system by spraying of feed from pipe 1 in oil scrubber 6, and such minor traces as may pass into water scrubber 11 is removed as a slurry through pipe 81 and evaporated into the system in the heat exchanger at 133, so that it cannot escape the system but must finally be agglomerated at some future time and eventually pass into collection system 149, or burn as fuel in furnace 41.

If desired the oil fuel in line 44 and/or the oil feed in line 42 of one furnace may have been used to wash the tail gas of another furnace of the same, or different type, by closing valve 47 and opening the valve in line 151 which connects to a cross-over line, like line 152, but of another unit similar to the one shown. Cross-over line 153 can be used when the oil goes from a line in another unit corresponding to line 34 to line 39 of the present unit.

While there has been shown a single furnace 41 which produces tail gas 51 which is returned through pipe 103 to the same furnace, it is within the scope of the present invention to produce this gas in one or more furnaces which may be all one type or of different types, and then return the same to one or more furnaces which may be of the same or different types. Similarly while the feed in pipe 1 has been shown removing carbon black from the tail gas of the same carbon black furnace 41 that said feed is injected into at 42 as feed thereof, or as fuel 46 for heating said feed to said furnace, it is within the scope of this invention to use the feed or fuel for one or more furnaces of one type, or of different types, as scrubbing liquid in removing carbon black particles in separator 6 from the tail gas from one or more furnaces of the same or of different types.

In Figure 2 is shown an illustrative embodiment of a modus operandi showing how the cross-over described in the last two paragraphs can be applied to the furnaces 41 of Example A and 41' of Example B below. The upper portion of Figure 2 is a tracing of the lower furnace portion of Figure 1 omitting showing the oil wash 6 portion thereof in order to have space to show in the lower portion of Figure 2 the furnace portion of Example B, the oil wash portion of which is omitted because of lack of space. However, it should be obvious the oil wash portions are used, and lines 3 and 3' carry dilute smoke thereto and lines 31 and 31' return oil slurry therefrom respectively. In Figure 2 for purposes of clarity and simplicity all valves that are open and all pipes that are unused in Examples A and B respectively are omitted, as Figure 1 showed a lot of alternatively used equipment for employing the large number of different hook-ups possible in the practice of the present invention. Figure 2 is limited to one specific hook-up permitting cross-over as described above. Like parts in the lower portion of Figure 2 are given the same numbers, except primed, as corresponding parts in the upper portions of Figure 2 to avoid confusion.

In Figure 2, to make the carbon black of Examples A below, furnace 41 is supplied with annulus air through pipe 116 and tangential air through pipe 122, axial oil at 42 being supplied from oil slurry line 31', pump 33', lines 34', 39', 153, 39 and 42. Furnace 41' is supplied with annulus air through pipe 116' and tangential air through pipe 122', axial oil at 42' being supplied from oil slurry line 31, pump 33, lines 34, 39, 152, 39' and 42'. Additionally furnace 41' is supplied with tangential fuel gas (as described above with reference to line 98 of Figure 1) through line 98', 108' and 46' to make the carbon black of Example B below.

Thus it is evident that in furnace 41' there is a process for producing carbon black comprising burning a fuel 46' with air 122' to produce hot combustion gases, pyrolitically converting a portion of a feed 42' consisting essentially of hydrocarbons into carbon black in furnace 41', and in a second zone 41 burning hydrocarbons 42 to produce hot combustion gases and pyrolytically converting a portion of hydrocarbon feed 42 into carbon black, and passing oil 31 containing carbon black from 31 through pump 33, and pipes 34, 152, 39' and 42' to form a portion of the feed in said second zone 41'.

*Example A*

In Example A, as applied to Figure 1, 2,950 cubic feet per minute of wet gas containing 47 per cent $H_2O$ having a temperature of 500° F. enters oil scrubber 6 through pipe 8. This gas has a dry analysis of 65.8 parts by volume nitrogen, 17.6 hydrogen, 12 carbon monoxide, and 4.6 carbon dioxide. It is preferable to operate scrubber 6 so the off gas leaving through 9 is above the dew point which is about 170° F., so the operation is adjusted so the temperature of 9 is 177° F. which can be done feeding 2.17 gallons per minute of feed oil 1 at atmospheric temperature into the system, recycling 13.23 gallons per minute of oil through line 28 and cooling the same from 250° F. to 90° F. in cooler 29 by heat exchange, removing 7500 B. t. u. per minute. As a result the oil entering chamber 6 is a total of 15.4 gallons per minute, at a little less than 90° F., and 15.2 gallons per minute emerge from the bottom of tank 6 at 250° F., of which 13.23 gallons per minute is recycled through 28 and 1.96 gallons per minute pass to the reactor through line 31. The 0.2 gallon per minute that evaporates in scrubber 6 and passes through lines 9, 12, 48 into separator 64 is returned through line 71 to the separator 6.

It will be observed that the oil at 250° F. in line 31 can easily be heated to its vaporizing temperature or above in coil 36 in heat exchanger 133 where the temperature of the smoke entering exchanger 132 from line 131 is preferably between about 700° F. and 2,000° F. but generally not above about 1500° F.

In Example A it is preferred to inject vaporized or atomized oil axially into furnace 41 through pipe 42 surrounded by a minor amount of air injected as an annulus through pipes 116 and 126 and provide the heat in furnace 41 by burning part of the feed with air injected tangentially of the interior of furnace 41 through pipe 122.

In this operation the vaporized or atomized normally liquid hydrocarbons are turbulently mixed with air and partially combusted therein, the carbon black nuclei picked up from gas 8 in scrubber 6 being turbulently mixed and heated in a carbon black depositing atmosphere for a relatively long period of time, with a resulting relatively large amount of aggregation by collisions with other particles, so that the carbon black formed is of type (a) the high structure carbon black, also known as high modulus furnace (HMF) carbon black.

*Example B*

In Example B, as applied to Figure 1, the gas in pipe 8 amounts to 7900 cubic feet per minute at 500° F. and contains 43 percent water. It also contains 69.6 parts by volume of nitrogen, 13.3 hydrogen, 5.1 carbon dioxide and 12 parts carbon monoxide. The temperature of gas in pipe 9 is 172° F. 4.6 gallons of feed per minute enters the system through pipe 1 and 36.6 gallons per minute is recycled through pipe 38 making a total of 41.2 gallons per minute at 90° F. entering the top of chamber 6. From the bottom of the chamber 40.7 gallons per minute emerges at 277° F., of which 4.1 gallons per minute passes through line 31 and 1 gallon per minute enters the furnace tangentially as fuel through line 46, while 3.1 gallons per minute enters as axial feed through line 42. As 36.6 gallons per minute is recycled through line 28 and is cooled from 277° F. to 90° F. in cooler 29 by removing 2400 B. t. u. per minute, there remains a difference of 0.5 gallon per minute of oil which evaporates in tank 6 and passes out through line 9 (as in Example A) which is returned through line 71 as explained above.

In Example B the burning of oil from 46 with air from line 122 creates intense heat in an enlarged portion of the furnace through which vaporized or sprayed oil 42 is passing axially into a reduced size section with the result that a carbon black of type (b) of small particle size having a high abrasion resistance is produced, generally known as a high abrasion furnace (HAF) carbon black.

While a drawing has been provided and examples are given for illustrative purposes, obviously the invention is not limited solely thereto, but instead has a scope defined by the following claims.

Having described my invention, I claim:

1. A process for producing carbon black comprising the steps of burning a fuel to produce hot combustion gases, pyrolitically converting a portion of a feed consisting essentially of hydrocarbons into carbon black and gas by passing said feed in a vaporous state in contact with said hot combustion gases, separating the major portion of said carbon black from said gas by dry separation process steps, washing the remaining carbon black out of said gas with a normally liquid oil consisting essentially of hydrocarbons, and passing said oil from said washing step containing said remaining carbon black as said feed and said fuel to said pyrolitic conversion.

2. A process for producing carbon black comprising the steps of burning a fuel to produce hot combustion gases, pyrolitically converting a portion of a feed consisting essentially of hydrocarbons into carbon black and gas by passing said feed in a vaporous state in contact with said hot combustion gases, separating the major portion of said carbon black from said gas by dry separation process steps, washing the remaining carbon black out of said gas with a normally liquid oil consisting essentially of hydrocarbons, and passing said oil from said washing step containing said remaining carbon black as said feed to said pyrolitic conversion.

3. A process for producing carbon black comprising the steps of burning a fuel to produce hot combustion gases, pyrolitically converting a portion of a feed consisting essentially of hydrocarbons into carbon black and gas by passing said feed in a vaporous state in contact with said hot combustion gases, separating the major portion of said carbon black from said gas by dry separation process steps, washing the remaining carbon black out of said gas with a normally liquid oil consisting essentially of hydrocarbons, and passing said oil from said washing step containing remaining carbon black as said fuel to said pyrolitic conversion.

4. A process for producing carbon black comprising the steps in a first zone of burning a fuel to produce hot combustion gases, pyrolitically converting a portion of a feed consisting essentially of hydrocarbons into carbon black and gas by passing said feed in a vaporous state in contact with said hot combustion gases, separating the major portion of said carbon black from said gas by dry separation process steps, washing the remaining carbon black out of said gas with a normally liquid oil consisting essentially of hydrocarbons; and in a second zone the steps of burning hydrocarbons to produce hot combustion gases, pyrolitically converting a portion of a feed consisting essentially of hydrocarbons into carbon black and gas by passing said feed in a vaporous state in contact with said hot combustion gases, separating the major portion of said carbon black from said gas by dry separation process steps; and passing said oil containing said remaining carbon black from said washing step in said first zone to form a portion of said feed in said second zone.

5. A process for producing carbon black comprising the steps in a first zone of burning a fuel to produce hot combustion gases, pyrolitically converting a portion of a feed consisting essentially of hydrocarbons into carbon black and gas by passing said feed in a vaporous state in contact with said hot combustion gases, separating the major portion of said carbon black from said gas by dry separation process steps, washing the remaining carbon black out of said gas with a normally liquid oil consisting essentially of hydrocarbons; and in a second zone the steps of burning hydrocarbons to produce hot combustion gases, pyrolitically converting a portion of a feed consisting essentially of hydrocarbons into carbon black and gas by passing said feed in a vaporous state in contact with said hot combustion gases, separating the major portion of said carbon black from said gas by dry separation process steps; and passing said oil containing said remaining carbon black from said washing step in said first zone to form a portion of said feed in said second zone.

6. A process for producing carbon black comprising the steps in a first zone of burning a fuel to produce hot combustion gases, pyrolitically converting a portion of a feed consisting essentially of hydrocarbons into carbon black and gas by passing said feed in a vaporous state in contact with said hot combustion gases, separating the major portion of said carbon black from said gas by dry separation process steps, washing the remaining carbon black out of said gas with a normally liquid oil consisting essentially of hydrocarbons; and in a second zone the steps of burning hydrocarbons to produce hot combustion gases, pyrolitically converting a portion of a feed consisting essentially of hydrocarbons into carbon black and gas by passing said feed in a vaporous state in contact with said hot combustion gases, separating the major portion of said carbon black from said gas by dry separation process steps; and passing said oil containing said remaining carbon black from said washing step in said first zone to form a portion of said feed in said second zone.

7. The process of claim 2 including the step of water washing the effluent gas from the oil washing step, recovering the oil from the water washing step and returning it to the effluent oil in the oil washing step.

8. The process of claim 1 including the step of water washing the effluent gas from the oil washing step, recovering the oil from the water washing step and returning it to the effluent oil in the oil washing step.

9. The process of claim 3 including the step of water washing the effluent gas from the oil washing step, recovering the oil from the water washing step and returning it to the effluent oil in the oil washing step.

10. The process of claim 9 including the step of removing the major portion of the carbon dioxide from the effluent gas from the water washing step and passing said gas as fuel to a process for producing carbon black pyrolitically from hydrocarbons.

11. The process of claim 3 including the step of removing the major portion of the carbon dioxide from the effluent gas from the oil washing step and passing said gas as fuel to a process for producing carbon black pyrolitically from hydrocarbons.

12. The process of claim 2 including the step of removing the major portion of the carbon dioxide from the effluent gas from the oil washing step and passing said gas as fuel to said process for producing carbon black pyrolitically from hydrocarbons.

13. The process of claim 1 including the step of removing the major portion of the carbon dioxide from the effluent gas from the oil washing step and passing said gas as a fuel to said process for producing carbon black pyrolitically from hydrocarbons.

14. The process of claim 2 including the step of passing said oil from said washing step in indirect heat exchange with said pyrolitic conversion and thereby heating said oil and passing the same as said feed to said pyrolitic conversion.

15. The process of claim 3 including the step of passing said oil from said washing step in indirect heat exchange with said pyrolitic conversion process, thereby heating said oil and passing the same as fuel to a process for producing carbon black by pyrolysis of hydrocarbons.

(References on following page)

References Cited in the file of this patent

UNITED STATES PATENTS

| | | |
|---|---|---|
| 1,373,704 | Bates | Apr. 5, 1921 |
| 1,438,032 | Frost | Dec. 5, 1922 |
| 1,902,746 | Yunker | Mar. 21, 1933 |
| 2,375,795 | Krejci | May 15, 1945 |
| 2,564,736 | Stokes | Aug. 21, 1951 |
| 2,587,107 | Cade | Feb. 26, 1952 |

OTHER REFERENCES

Chemical Engineering, vol. 59, No. 9, September 1950, pages 203 and 205.